(12) United States Patent
Buschmann et al.

(10) Patent No.: US 11,392,108 B2
(45) Date of Patent: Jul. 19, 2022

(54) PRODUCTION MODULE

(71) Applicant: Siemens Aktiengesellschaft, Munich (DE)

(72) Inventors: Frank Buschmann, Munich (DE); Vladimir Zahorcak, Borinka (SK)

(73) Assignee: SIEMENS AKTIENGESELLSCHAFT

(*) Notice: Subject to any disclaimer, the term of this patent is extended or adjusted under 35 U.S.C. 154(b) by 126 days.

(21) Appl. No.: 16/581,878

(22) Filed: Sep. 25, 2019

(65) Prior Publication Data

US 2020/0103851 A1 Apr. 2, 2020

(30) Foreign Application Priority Data

Sep. 28, 2018 (EP) .................................... 18197562

(51) Int. Cl.
*G05B 19/418* (2006.01)
*B65G 43/08* (2006.01)
(Continued)

(52) U.S. Cl.
CPC .......... *G05B 19/418* (2013.01); *B65G 43/08* (2013.01); *G05B 19/0426* (2013.01); *G05B 19/18* (2013.01)

(58) Field of Classification Search
CPC .............. G05B 19/418; G05B 19/0426; G05B 19/18; G05B 19/41875; G05B 2219/32252;
(Continued)

(56) References Cited

U.S. PATENT DOCUMENTS

2004/0039468 A1* 2/2004 Zahorack .................. G06F 8/24
700/97
2012/0029656 A1 2/2012 Colombo et al.
(Continued)

FOREIGN PATENT DOCUMENTS

DE 102015218601 A1 3/2017

OTHER PUBLICATIONS

SOA—Service Oriented Architecture [https://en.wikipedia.org/wiki/Service-oriented_architecture].
(Continued)

*Primary Examiner* — Tejal Gami
(74) *Attorney, Agent, or Firm* — Schmeiser, Olsen & Watts LLP

(57) ABSTRACT

Provided is a production module for the execution of at least one production function upon or for a product, wherein the production function is configured for interaction with a further production function of a further production module in a production operation, and the production module is executable as a self-similar fractal module, having an execution unit for the autonomous execution of the at least one production function, having a processor unit for the delivery of a production service for accessing the at least one production function, a self-description service for the delivery and communication of self-descriptive information incorporating properties of the production function for the further production module, and for the reception of further self-descriptive information incorporating properties of the further production function, a coupling service for the determination of a cooperation zone.

7 Claims, 3 Drawing Sheets

Figure 1:
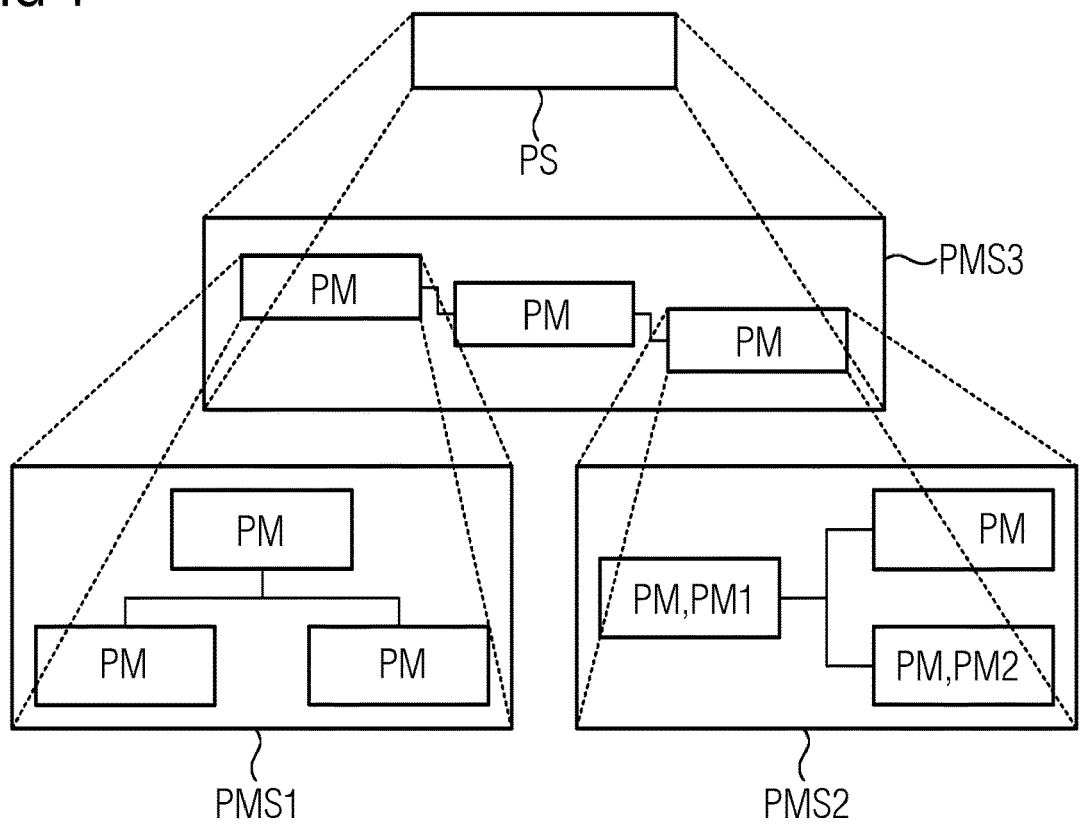

(51) Int. Cl.
*G05B 19/042* (2006.01)
*G05B 19/18* (2006.01)

(58) Field of Classification Search
CPC ....... B65G 43/08; Y02P 90/30; G06Q 10/067; G06Q 10/06315; G06Q 10/0633; G06Q 50/04
See application file for complete search history.

(56) References Cited

U.S. PATENT DOCUMENTS

2017/0322542 A1 11/2017 Zahorcak
2018/0029803 A1 2/2018 Buschmann et al.

OTHER PUBLICATIONS

E. Gamma et al., „Design Patterns: Elements of Reusable Object-oriented Software, Addison Wesley, 1995; 1995.
F. Buschmann et al., „Pattern-Oriented Software Architecture, vol. 4, in „Pattern Language for Distributed Computing, John Wiley and Sons, 2006; 2006.

* cited by examiner

PRODUCTION MODULE

CROSS-REFERENCE TO RELATED APPLICATIONS

This application claims priority to European Application No. 18197562.4, having a filing date of Sep. 28, 2018, the entire contents of which are hereby incorporated by reference.

FIELD OF TECHNOLOGY

The following relates to a production module for the execution of a production function for a product, in the context of a production operation.

BACKGROUND

Using current technologies, the cost-effective mass production of complex and customized products, e.g. private cars, is only possible if all the potential variants of the product are considered from the product planning phase onwards. As soon as the product design and product engineering are known, a specific production process is established, which incorporates production facilities which are capable of executing that specific production process. If new product variants are to be supported, a repeated execution of the entire development and planning process is required, with additional expenditure and costs. The greater the susceptibility of a product portfolio to the influence of corresponding variants, the less efficient, and probably less profitable the production process thereof will be. An alternative to mass production is the individual or small-batch production of individual products, although this is extremely cost-intensive, in the light of the high expenditure associated with the planning and set-up of production, such that this approach is only considered at all for small production runs of high-value products with large profit margins.

SUMMARY

An aspect relates to an option for the production planning and production of a product to be made dynamically adaptable to both predefined and dynamically variable requirements.

The embodiments relate to a production module for the execution of at least one production function on or for a product, wherein the production function is configured for interaction with a further production function of a further production module in a production operation.
Hereinafter, the terms product and workpiece are employed synonymously, unless indicated otherwise.

In the context of the present description, the term production function is understood to mean, for example, that a product is processed and/or conveyed by the production function. The product itself can generally be any type of processable material such as, for example, a timber block, a steel block, a plastic block or a fluid. Processing is dependent upon the actual configuration of the product, for example, in the case of a fluid, the production function can constitute a filtration of the fluid, or a measurement of the constituents of the fluid. In the case of a product in the form of a solid material, the production function can be constituted by the surface coloration of the product, or by a milling operation. As the product undergoes the production process, its external form can change. The production function and/or further production function act upon the product accordingly. A production function can further be understood to include a data processing process and/or a data provision process which is configured in software, hardware and/or a combination thereof, wherein, for the product, a data processing operation is executed in the context of the production of the product. To this end, the production function, on the basis of measured production values, such as atmospheric humidity or temperature, can determine a ratio for the mixing of two fluids, which is employed by the further production function, for example, for the application of a lacquer. In the context of the description, production is to be understood as the conveyance and/or processing steps applied by way of a temporal sequence of production functions executed on or for the purposes of the product. In a production function, the product can also be supplemented by a component product, e.g. the fitting of a screw in the product. Production can thus be executed by way of a plurality of production functions of the production modules.

The representation of the production function of the production module also applies to the further production module, and the further production function thereof.

According to embodiments of the invention, the production module is executable as a self-similar fractal module, by way of the units described hereinafter. The employment of a fractal architecture permits a dynamic composition and the simple rearrangement of the respective production modules in the production operation. In the context of the description, self-similar signifies that a single production module, considered from the exterior, behaves in exactly the same way at its interfaces as a cluster of production modules, wherein the cluster, considered from the exterior, behaves as a single production module. Only the number of available production modules is, in general, greater in the cluster than in an individual production module. A combination of a plurality of production modules is described as a production system. A specific configuration for the production of a specific product is constituted by the production operation for the specific product.

As a self-similar fractal module, the production module can be present at each level of the production system, i.e. of the production installation, for example at a work unit level, at a work center level, at a production level or even at a production site level. On the grounds of its self-similarity, the above-mentioned approach accommodates hierarchical production configurations using common and uniform methods for the constitution of the production system. A known constitution method is known, for example, as a "composite pattern", according to reference source [1]. Thus, in the design of embodiments of the invention described, a hierarchical structural approach is selected, in which each element in the hierarchy, for example each production module—whether in a combined form or as a discrete unit—provides the same properties with respect to the interfaces employed, the functional behavior and the composition in the combination of structures. The result is a fractal hierarchical design. If this method is applied to self-similar production modules, the fractal production system ensues. The practical integration of a production module in a hierarchy of this type is fractal per se, as a result of which, in a recursive manner, a fractal design of a combination of a plurality of self-similar production modules in the overall production operation is generated at every hierarchical level. This is represented in an exemplary manner in FIG. 1, in which fractal production is represented on three levels. FIG. 1 will be discussed in greater detail in the descriptive section of the exemplary embodiments.

The recursive constitution of the production system from self-similar fractal production modules represents the fundamental method for the recursive constitution of the production of self-similar fractal production modules, with a view to a flexible with respect to the constitution and also the subsequent modification of a production system, and thus the production itself. A production design of this type permits rapid adaptation, for example in the case of the occurrence of errors or in the case of production requirements, for highly customized products.

In the approach described above, interaction, i.e. cooperation, between a plurality of self-describing fractal production modules will result in an interaction whereby, on the grounds of their uniform generic descriptions of production capability and interaction methods, and the availability of respective digital self-descriptive information on production functions based upon general standards, no further manual interventions in composition and/or subsequent modification are required. In comparison with equivalent technologies, the above-mentioned method facilitates a substantial economy in the planning of production or the production system, and in the installation thereof. Self-describing production modules further permit a simplification, and the saving of both time and expenditure, both at the project development stage (also described as "engineering") and in the constitution of a specific production process in a production operation. By this approach, an optimization, and thus a concomitant cost saving, in the set-up of production and operation during the manufacture of predefined products is substantially permitted. As a result, inter alia, production module downtimes can also be substantially reduced.

In the context of embodiments of the invention, the production module comprises an execution unit for the autonomous execution of the at least one production function, which is constituted, for example, in a preferred further development of embodiments of the invention, by means of mechanical components, electrical components, control components, sensor components or software components.

The function of the above-mentioned components, individually or in any desired combination, in the execution of the production function, is to permit the action of the production function on the product. The production function thus constitutes a defined production step within the production operation, which is describable by a production plan. In order to permit the standalone, i.e. autonomous, execution of the production function by the production module, the production module, by means of its control component, can execute real-time control functions and optimization functions for the production step, but also quality control functions and the visualization of states of the production module, in an autonomous manner. Moreover, the execution unit can independently control additional means for the execution of the production function, namely the electrical and mechanical systems which are required for the execution of the production function, without the necessity for any external intervention. Such external intervention can occur prior to the execution of the production function in the form of a parameter setting for the production function, for example, a speed of a conveyor belt. This parameter setting can be executed by an automation service. However, the execution of the production function itself proceeds autonomously.

The production module further comprises a processor unit for the delivery of a plurality of services.

By the employment of services in a service-oriented architecture, the production module can communicate to the further production module those specific services which are supported by the production module. Moreover, the production module can obtain information from the further production module on services which are delivered by the further production module. By the employment of services, it is ensured, firstly, that virtually any type of function of the production module or of the further production module can be "signaled". Secondly, by the employment of services, access to the functions is made possible in a simple manner via the production module itself and via the further production module, in a form of remote access.

By means of services, production modules with virtually any type of production function can be realized, which can be coupled to further production modules in a simple and cost-effective manner by means of a cooperation zone. A more detailed representation of services can be sourced from the descriptions set out hereinafter. Hereinafter, the terms processor and processor unit are employed synonymously.

As a service, the production module incorporates a production service for the delivery of the production function.

The employment of the production service permits the production module to be identified in the production system in a standardized form, and access to the at least one production function of the production module can be permitted. Identification and access are permitted, due to the fact that the production function is embodied by the production service, for example in the form of a software service. The production service is administered and executed in a real-time infrastructure of a service-oriented architecture (SOA), which can be executed on the processor. The processor can be configured in the form of a programmable logic controller, or in the form of an embedded industrial PC. The production service is accessible via an interface for the further production module. A service management functionality within the service-oriented architecture such as, for example, a service registration functionality and/or a functionality for locating services within the production system permits the locating and accessing of the production service interface of the production module. The employment of the service-oriented architecture thus permits remote access to the production service interface, which constitutes a functionality for cooperation between two production modules in a specific production process, for example within the cooperation zone.

The production module further comprises, as a service, a self-description service for the delivery and communication of self-descriptive information incorporating properties of the production function for the further production module, and for the reception of further self-descriptive information incorporating properties of the further production function.

The self-description service makes available self-descriptive information. The self-descriptive information delivers information for the characteristic definition of the at least one production function of the production module, for example information for the identification of the production function, information on practical capabilities, configuration parameters, data concerning limitations, for example with respect to functional and/or technical executability, commands which can be understood and optionally executed by the production function, and states which can be communicated and understood by the latter. The self-descriptive information is used to describe the production module, and to execute a check on the availability of self-descriptive information for a specific production task, in accordance with the specific production plan for the production operation. The self-descriptive information can further be employed for the configuration of production functions with specific production parameters, in order to thus compile the production functions of a plurality of production modules, and execute them in accordance with a production process.

In order to ensure the self-similarity of all the production modules in a production system, specifically where production modules originate from various manufacturers and, potentially, are also implemented and executed on different hardware platforms, the self-descriptive information, according to an advantageous further development of embodiments of the invention, can be represented by means of a standard such as, for example, OPC UA, i.e. OPC Unified Architecture of the OPC Foundation. These standards permit the implementation of ontologies for the production function in a defined and standardized manner. Description of the production capability of the production module by means of self-descriptive information and public access to this description can be constituted as a self-description service or in the form of a digital twin, by means of the service-oriented architecture. In general, the digital twin constitutes a virtual representation of the production function, wherein the representation can be adjusted by continuous updating to match the status of the production function. The virtual representation can be configured as a model which possesses the physical properties of the actual production function. Where a plurality of production functions can be executed by the production module, at least one self-descriptive information element can be provided for each production function.

The production module further comprises a coupling service for the determination of the cooperation zone, by the constitution of cooperative information (INFO), wherein the production function and the further production function, specifically sequentially or simultaneously, can be executed upon or for the product.

While the architecture of the fractal production system represents a fundamental approach for the flexible and dynamic constitution of production modules, this approach is further extended by the coupling service, in that it permits the automatic arrangement of practical and achievable cooperation between the fractal production module and its cooperation partners, for example with further production modules arranged in direct proximity, or with a superordinate further production module in the fractal production system.

The coupling service uses the self-description service to obtain access to self-descriptive information relating to the at least one production function of the production module. This description represents the technical foundation for the practical arrangement and constitution of cooperative information for the purposes of the fundamental cooperation of the production module with its cooperation partners such as, for example, the further production module. Specific arrangement of the self-similar production modules with their cooperation partners can then be executed in a peer-to-peer manner by means of the coupling service and/or by means of an automation service, or by the involvement of a further unit, which undertakes the arrangement. Arrangements themselves can be executed, for example, in the form of an auction. By the employment of the coupling service, a flexible and cost-effective option is provided, firstly for modifications of the production module and/or of the further production module, and secondly for modifications of the product, for example in the event of the customization of the product, to be taken into account.

The production module further incorporates an automation service for the determination of cooperation parameters for the execution of the production function upon or for the product, in accordance with a production requirement.

The automation service is activated for the execution of a specific production operation on the basis of a production requirement. Depending upon the production function(s) to be executed, those production functions within the production system are selected which is/are capable of implementing the requisite production step(s) for the production requirement. Depending upon the product to be manufactured, cooperation parameters are firstly established within the respective cooperation zones. The production modules involved in production then assume their automation state, i.e. enter the automation phase, in which they await a practical application of the production functions, for example the execution of a conveyance or processing step on the product to be produced triggered by commands and status information. In the event of a change in the configuration within the production system during the automation phase, for example as a result of the loss of a production module, for example owing to a technical defect, at least elements of the steps executed in the plug-in phase for the configuration of the automation phase are repeated by means of the coupling service and elements of the automation service.

The production module further comprises a production interface for the exchange of control information with the further production module, in the form of commands for the control of the production function and in the form of status information for the production function and status information for the further production function.

The production interface permits the cooperation, i.e. the collaboration, of two production modules or production functions by means of control information, i.e. by means of commands and statuses, which are defined by the self-descriptive information of the production module and are substantiated, by means of the coupling service and the automation service, for the practical execution of a collaboration between two or more production functions for a specific product. By means of the commands, the production function can be actively configured, influenced and controlled, for example for the start-up, interruption or termination of the production function. This general and generic approach permits the execution of specific actions with respect to the production function, independently of a practical implementation of the commands and the complexity of the commands to be executed in the production module. Commands of this type consequently permit the execution or control of a large number of different actions for the production function, specifically methods for the reception of generic commands and methods, for the management and processing of generic commands, for example in accordance with a "command processor design pattern" approach, as described in greater detail in reference source [2].

Statuses are employed in a two-fold manner. The first of these manners describes the possibility for the communication by the production module of its current statuses to the further production module, for example to the effect that the production function is ready to receive or process a product, or to the effect that the production module has terminated the application of the production function to the product, and the product is consequently ready for the execution of the further production function by the further production module. A second form of employment of statuses is characterized in that the production module can react to a current status of the further production function and/or of the further production module, for example to the effect that the product is ready for acquisition by the production module, i.e. for the execution of its own production function. In this case, the further production function or the further production module gives notice of its statuses in the production system. The processing of statuses can be executed by an observation method, in accordance with reference document [1], and/or in accordance with a design pattern, in accordance with reference document [2].

The production interface, which delivers commands and statuses information for the production service, permits a simple, standardized and generic procedure for interaction with one or more production functions of the respective production module. Interactions of this type can be implemented between a plurality of self-similar production modules, as in the event e.g. of direct cooperation between production modules, or between a self-similar production module and other participants such as, for example, an IT system, a data analysis unit, or a human administrator via a human-machine interface, or products can control their own production process through the agency of a digital product memory. Active control of a production function is triggered by the transmission of associated commands to the command process interface thereof within the production service, in order to start up or interrupt the production function, to set the production status to a definable state, or to request information for a further diagnostic function.

Reactive control in the execution of the production function is achieved by the disclosure of relevant statuses for the actual production operation, for example to the effect that the production function has completed the processing of the product, or the desired location for the handover of the product by the production function to the further production function, on the status processing interface thereof, wherein the respective statuses are disclosed by the further production unit of the fractal production system which is connected thereto. Whenever the status processing interface within the production interface receives information on specific statuses, the implementation of the production function will carry out an associated action. For example, the production module initiates its collaboration with the further production module, if the further production module communicates the statuses "ready" or "available". In a further example, the production module initiates the execution of its production function once it has received status information to the effect that the product or production means, such as screws and similar, are ready for processing. Each specific cooperation between the self-similar production module and further cooperation partners is a combination of two types of interaction, which is adapted to a specific cooperation assignment, although all specific cooperation assignments will continue to be processed by the same standardized and generic procedure, as described above. The respective production module can thus cooperate with a plurality of cooperation partners in a further assignment, as in the event, for example, that a complex assembly operation is to be executed by a plurality of robots in tandem.

In a preferred further development of embodiments of the invention, the coupling service of the production module is further configured for the execution of the following steps for the determination of the cooperation zone:

Detection of a topology of the further production module in a combination of further production modules as an adjoining and/or superordinate further production module;

Detection of the further production function, which is available and achievable from a position of the production module in the combination of further production modules;

Communication of self-descriptive information to the combination of further production modules;

Arrangement of a procedure whereby the production function and the further production function (PF2) can be executed upon or for the product, specifically sequentially or simultaneously.

As soon as the production module, i.e. the self-similar production module, is physically and electrically connected, the constitution and set-up of the cooperation zone can be initiated by the coupling service, i.e. the "plug" step, with one or more further production modules. In general, the following steps can then be executed.

1. The production module identifies and connects to the existing combination of production modules, which are organized in the form of a production system.
2. The production module identifies
   a) the topology of the production system: its adjoining production module and superordinate production module, together with other cooperation partners within the production system;
   b) production capabilities which are available or achievable from the current location of the production module in the fractal production system, according to the topology of the production system;
3. The production module discloses its own production function or production functions in the production system, for example by means of the respective self-descriptive information;
4. The production module negotiates its cooperation, also described as the cooperation zone, with other cooperation partners, specifically with other production modules.

The production module can subscribe to all relevant states of the production system, for example with respect to negotiated cooperation within the at least one cooperation zone. Step 4 can be identified as a significant step in the above-mentioned "plug" sequence. In this step, the production module negotiates potential cooperation with its cooperation partners. By way of a result, this produces the manner in which practical cooperation can be executed with respect to the location of the production modules, together with strategies and parameters for the handover and combined handling of workpieces and materials.

By the provision and execution of at least some of the above-mentioned four steps, the production module can actively respond, in a highly flexible manner, to changes in both topology and production requirements, and can be very rapidly employed in a new production operation.

In a further preferred further development of the production module according to embodiments of the invention, in the step for the "arrangement" of the cooperation zone, at least one of the following approaches can be executed:

Provision of an indication of a locational region in which the production function and the further production function are available for execution upon or for the product;

Provision of a method and operating parameters of the production function and the further production function for a handover of the product from the production function to the further production function;

Provision of a method and operating parameters of the production function and the further production function for a common procedure with respect to the product or with respect to resources for the execution of the production function and of the further production function.

The manner in which a dynamic constitution of the production system is to be executed, by the cooperation of potentially adjoining production modules, can be arranged accordingly.

Thus, in the context of this arrangement, the production capabilities and mutually overlapping working areas of adjoining production modules can be considered. Production functions are required to permit "meaningful" cooperation, such as, for example, the CNC machine production module (CNC: computerized numerical control) delivers the "boring" production function, which is required by the further production function of the further "infeed and positioning" production module of the workpiece to be processed. A conveyor belt, which delivers the conveyance production function, can cooperate with the production function which delivers the infeed and positioning of a workpiece, in order to move the workpiece onto or from the conveyor belt. In another variant, as a production function, an assembly capability can also be provided, which performs the dismantling steps while the material is conveyed to the conveyor belt. If the capabilities of the production functions are compatible, it is established whether the working areas of adjoining production modules overlap to a sufficient extent to permit the execution of cooperation. For example, where a robot arm is intended to pick up the workpiece from the conveyor belt, the working area of the robot arm must extend above the conveyor belt, and it must be defined in which locational region of the conveyor belt the robot arm can pick up the workpiece. Regions of self-similar production modules in which cooperation can be executed are described as cooperation zones. Adjoining production modules must be reconciled with respect to predefined cooperation zones such as, for example, an infeed unit of a CNC machine and a three-dimensional corridor for access to the CNC machine. Alternatively or additionally, the cooperation zone can also be arranged on the basis of overlapping working areas, as in the above-mentioned case, in which the gripper of the robot arm accesses regions above the conveyor belt, and can thus pick up or set down the workpiece in this location. Moreover, the region can further be understood by way of an exchange of data between two production modules, which are employed for the processing of the product, such that, for example, one production module assumes the production function for the application of a color to the product, wherein the color composition is determined by a further production function of the further production module, and is communicated to the first production module. The cooperation zone, i.e. the region between the production module and the further production module in cooperative operation, consists of the practical configuration of one or more operating parameters such as, for example, the color composition, which are employed by the production function. The further production function acts on the product accordingly.

Moreover, the self-similar production module which cooperates with another production module within the cooperation zone can establish its specific behavior, i.e. its procedure, in the interests of the desired cooperation. This also relates to all physical and/or functional restrictions, i.e. operating parameters, such as maximum speed, throughput, or a larger workpiece. For example, in order to ensure reliable pick-up of the workpiece from the conveyor belt by the robot arm, the speed of the conveyor belt must be adapted to the motion of the robot arm. If a plurality of production modules, such as robot arms, coincide in a cooperation zone, they can or must establish a procedure whereby they are not competing for the same workpiece. If, for example, two robots wish to execute a transfer of the workpiece, by means of their grippers, within their shared cooperation zone, it is necessary for them to establish the robot arm speed, the angle of transfer and the contact pressure of the grippers on the workpiece. According to the proposed procedure, a human operator can adjust and/or override the automatically arranged parameters which are to be applied within the cooperation zone.

Moreover, the self-similar production module can negotiate production functions which are only made possible by the adjacent arrangement of two production modules. For example, a CNC machine with three axes, by means of a common cooperation zone, can be associated with a robot which populates the machine with the workpiece, such that the robot supports the CNC machine with two further axes, as a result of which the cooperation zone permits the execution of combined processing, as on a CNC machine with five axes. In a further example, two assembly robots can arrange the execution of complex assembly steps, which are only made possible by these two robots in the cooperation zone, for example, one robot attaches a second workpiece to the first workpiece which is to be processed, wherein the workpiece is required to change its position, such that the second workpiece can be accommodated in the first.

The result of this arrangement is a combination of two or more production functions of self-similar production modules in the fractal production system. By means of the coupling service, combinations of this type are established as available new production functions of the fractal production system, which are available in one definition of a production process, i.e. in accordance with a production requirement, for the production of a specific product in the context of production and, by the configuration of specific parameters, can be employed for the product to be manufactured. In the context of the present description, these parameters are also described as cooperative information.

In the description of the coupling service, it is represented that two production functions can cooperate, if these are located in an overlapping working area. In production modules for the conveyance or physical processing of the workpiece, the overlapping working area is to be understood as a locational region, for example in a production hall. Alternatively or additionally, the production module can also be an IP system, for example an industrial computer which, as a production function, for example, generates a measurement or an optimization of sequential production functions for the product, or applies the production function to the product. In this case, the overlapping working area is to be understood in that the production module which executes a hardware-oriented production function can cooperate with the production module which executes a non-hardware-oriented production function, such as a data analysis or a measurement, on a non-physical level. This can involve, for example, the optimization of a path of a milling bit in a CNC machine tool during the processing of the workpiece/product. There is no distinction in the principle of cooperation in the coupling zone, regardless of whether the production module is hardware-oriented or non-hardware-oriented. Only the practical configuration of the self-descriptive information differs.

In an optional further development of embodiments of the invention, the automation service of the production module can further be configured, in the event of a change with respect to the production module or with respect to the further production module, to initiate the coupling service and the establishment of cooperative information for the cooperation zone.

It is thus advantageously ensured that, in the event of a change in the structure of the fractal production system during production, for example on the grounds that a new self-similar production module is incorporated, removed or employed in a different position within the fractal production system, or on the grounds that the self-similar production module is no longer functional or no longer available, each self-similar production module which is affected by the change executes its own dynamic configuration. Specifically, a plurality of steps are executed for the establishment of the cooperation zone of the coupling service, such as, for example, the detection of topology, the detection of further production functions and the communication of self-descriptive information, for the adaptation of its own behavior to the change and for the purposes of optimization, in order to permit the transition to the production phase.

Steps delivered by the coupling service are described as the plug phase, and steps delivered by the automation service are described as the automation phase. One advantage of the production module according to embodiments of the invention is established, in that both phases can be executed in both the digital, i.e. the virtual, and the physical world. Execution in the virtual world permits an installation engineer to evaluate, simulate and optimize the structural arrangement of the self-similar production modules and their behavior in the plug phase and the automation phase prior to any actual implementation. This virtual commissioning and testing of the self-similar production modules in a fractal production system, in advance of technical implementation thereof, obviates any costly and time-intensive try-outs of arrangements of a plurality of production modules which are not feasible in the physical world.

The capabilities of the plug phase and the automation phase of self-similar production modules obviate restrictions, and permit the constitution of a flexible production system for state-of-the-art and progressive production approaches, specifically in a holonic production system and fractal production plants.

In the context of the present description, the term service-oriented architecture does not specifically designate a specific implementation, but a specific procedure for the delivery of functions of the production module and the provision of access to functions of the production module. Functions of the production module involve functions which, for example, are realized by the production service, the self-description service, the coupling service and/or the automation service. A transmission of information by these services, as well as the production interface, can be executed on wired network protocols such as, for example, a LAN (local area network) or Profibus, or by means of wireless network protocols including, for example, a WLAN (wireless local area network). Embodiments of service-oriented architecture, for example according to the bibliographical reference SOA [3], will be sufficiently known to a person skilled in the art, such that potential embodiments of services based upon a service-oriented architecture will not be addressed in any greater detail here. The employment of services as a service-oriented architecture thus constitutes a cross-platform, cross-manufacturer and cross-device option for the provision of access to the functions of the production module, for example the production function, in a generic manner. Within the respective service, a service management function can thus incorporate a service registry and a service discovery function, which permit the discovery and accessing of services such as the production service.

The representation of the production function of the production module applies correspondingly to the further production module and the further production function thereof.

BRIEF DESCRIPTION

Figure 2:
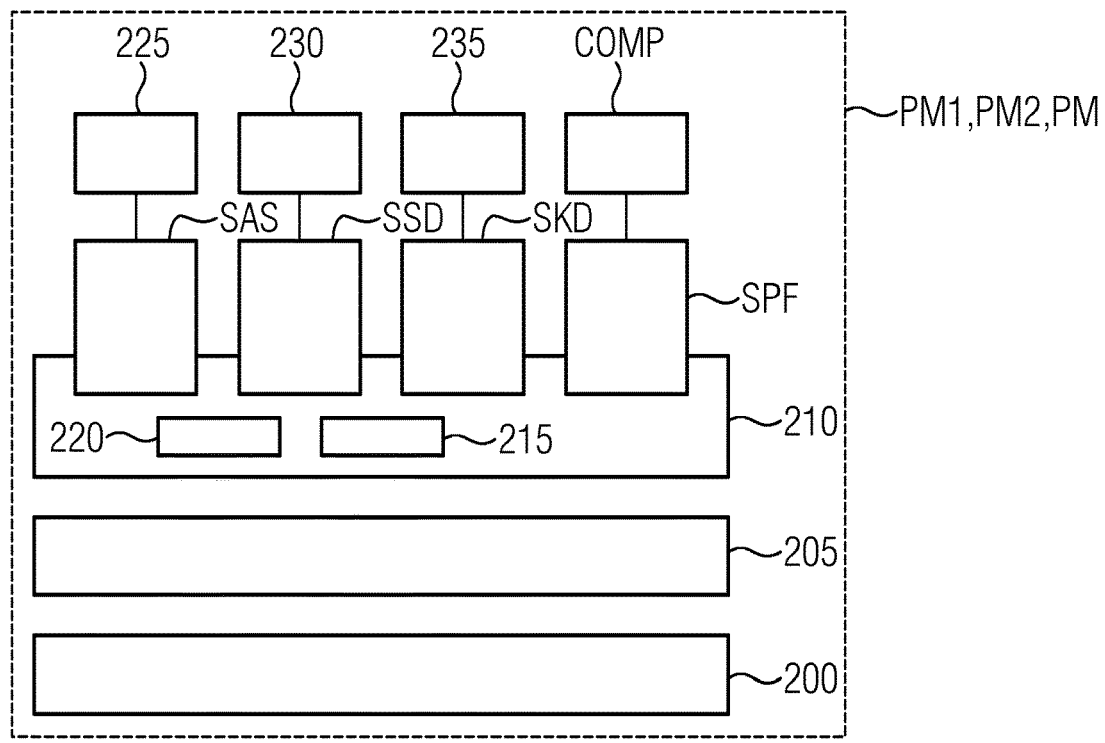
Figure 3:
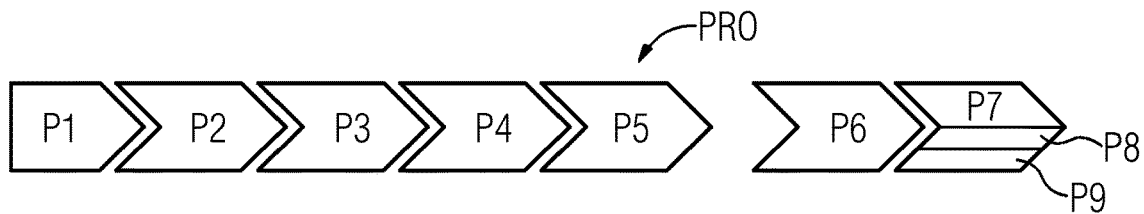
Figure 4:
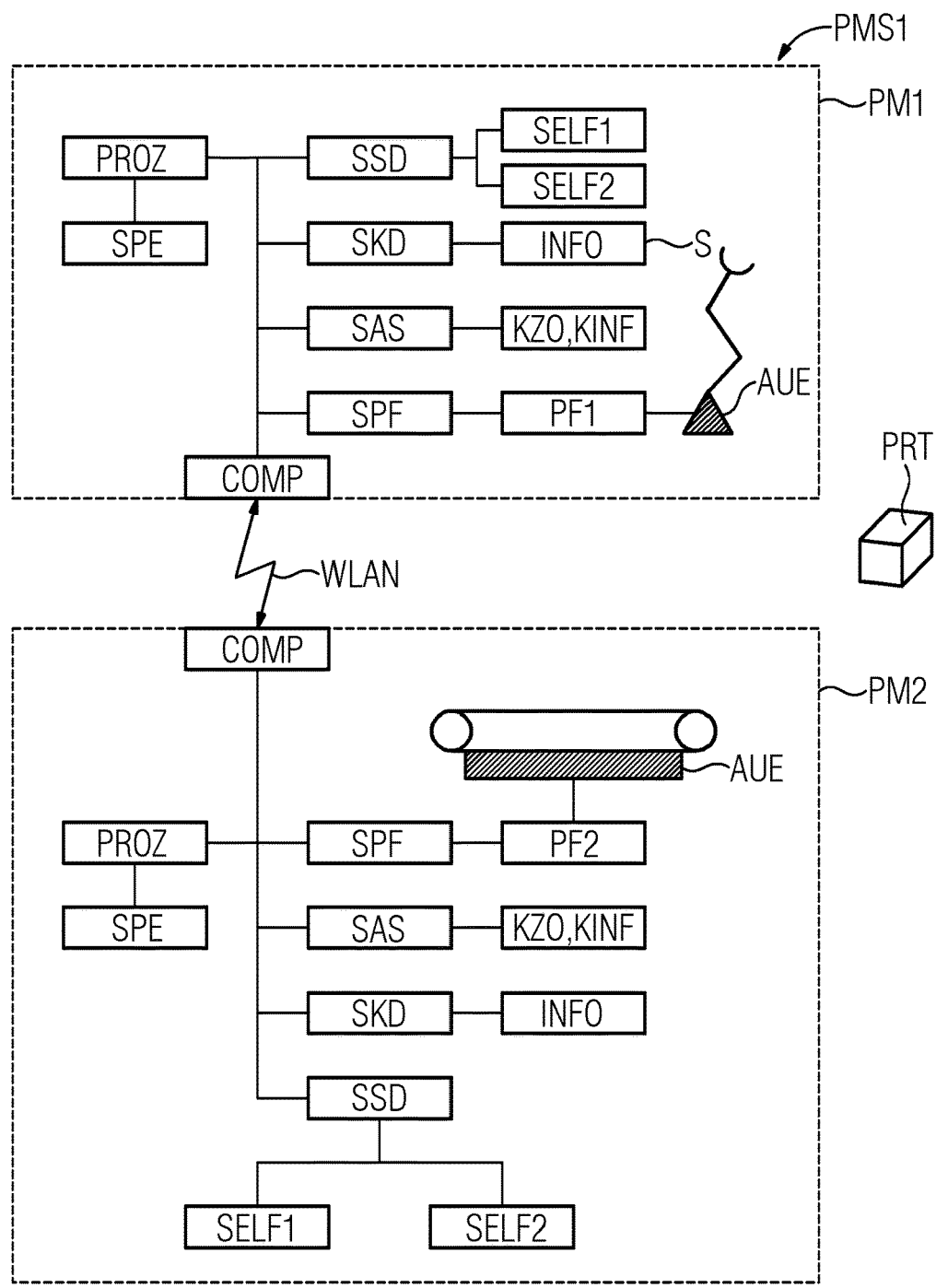
Figure 5:
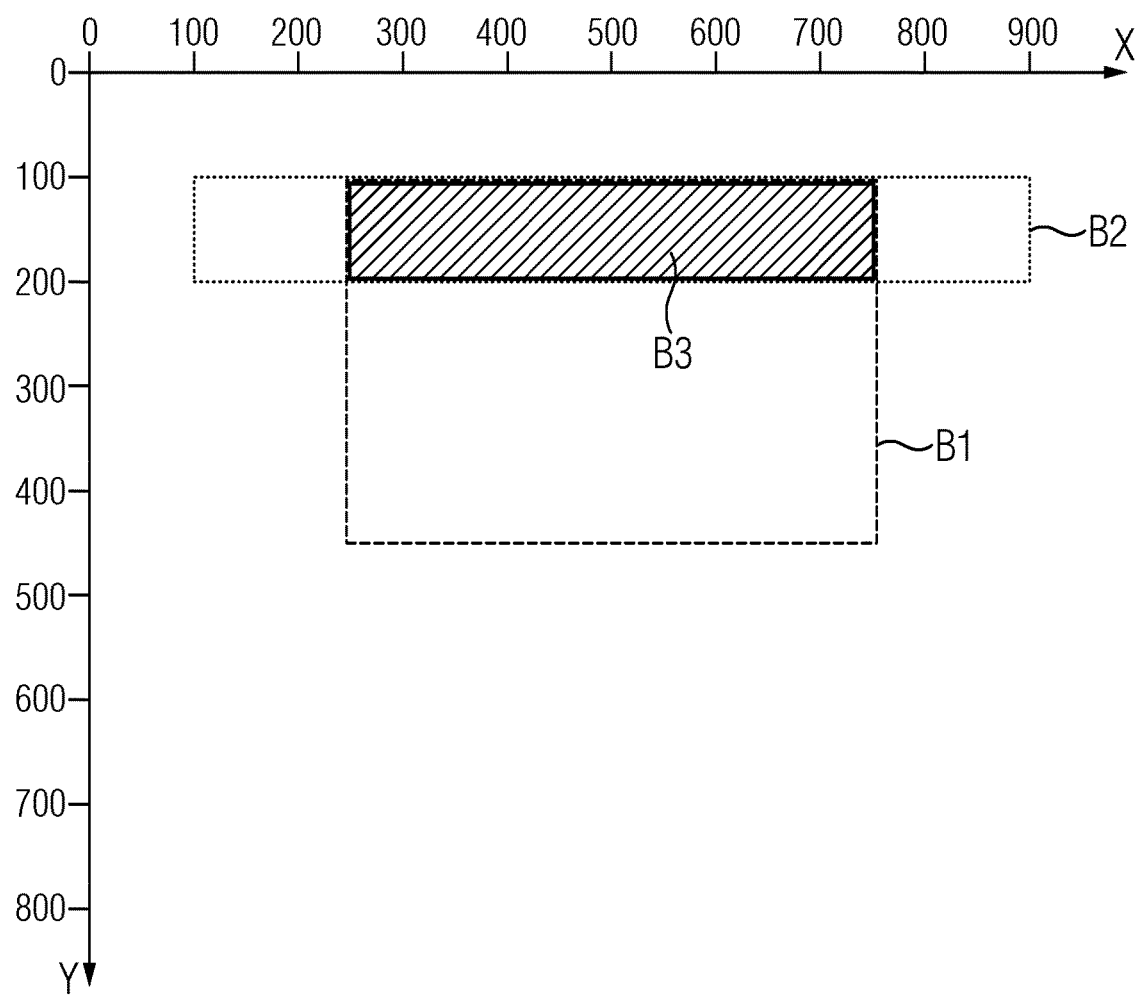

Some of the embodiments will be described in detail, with reference to the following figures, wherein like designations denote like members, wherein:

FIG. 1: shows a fractal recursive arrangement of a plurality of production modules in a production system;

FIG. 2: shows a layout of a self-similar production module;

FIG. 3: shows an overview of the "plug" and "automation" phases;

FIG. 4: shows the cooperation of two production modules for the conveyance of a workpiece; and FIG. 5: shows a representation of working areas of the first and second production function, and in the cooperation zone.

Elements with an identical function and mode of operation are identified in the figures by the same reference numbers.

DETAILED DESCRIPTION

FIG. 1 illustrates a fractal recursive composition of production modules PM, PM1, PM2. These production modules, also described as cyber physical production entities, can be present at any level of the production system PS, also known as the cyber physical production system. In FIG. 1, three production modules have been combined in a first production module system PMS1, and appear externally to other production modules as a further production module. Thus, in one production module system PMS2, three further production modules are combined, and appear to other production modules as a single production module. In a third production module system PMS3, three further production modules can be seen. On the grounds of the fractal design of the respective production modules, these three production modules can be combined for the purposes of collaboration, i.e. cooperation in their respective cooperation zone, and appear externally as a single production module. In their totality, all the production modules or production module systems constitute the production system PS. On the grounds of the hierarchical whole-part structure, each element in the hierarchy, regardless of whether it is present in the form of a production module or as a combination of a plurality of production modules, possesses the same properties with respect to its interfaces and its functional behavior. A fractal production system can be produced by way of the self-similar production modules as a result. Each specific arrangement of the production module in the hierarchy is, in turn, fractal by definition, such that a fractal design in the overall production system is recursively imposed at each hierarchical level.

FIG. 2 shows an exemplary layout of a production module PM, PM1, PM2. In FIG. 2, basic function blocks are illustrated, in order to represent the functional layout of the production module. Each production module comprises electrical and mechanical components such as, for example, a power supply, or mechanical elements of a robot arm. These are represented in the hardware block 200. The production module further comprises an automation block 205, which delivers fundamental automation functions by means of controllers, actuators and sensors. This automation block is also configured in the form of hardware, but incorporates at least the partial use of software in order to render this hardware useable for overlying layers, for example for the read-out of a sensor value or the indication of a contact pressure which a gripper of a robot arm is required to deploy, in order to grip a workpiece. The robot arm can be an element of the hardware block 200 and the automation block 205.

On the basis of the automation block, software-based blocks are constituted, which can be embodied in the form of a processor unit and its operating system—the processor unit and the operating system are not illustrated in FIG. 2. A block 210, as a software module, provides a service-oriented architecture in the form of a run-time infrastructure, which serves as a basis for the specific services of the production module, for example in accordance with a standard SOA. One element of the block 210 is a service 220, which is responsible for the registration and discovery of services. The block 210 further incorporates a network connection functionality 215, by means of which, via interfaces, external access to services is provided. Services can thus be controlled and evaluated from the exterior, for example from the further production module.

On the basis of the block 210, the production service SPF, the self-description service SSD, the coupling service SKD and the automation service SAS services are provided, wherein the above-mentioned services fulfil the following functions:

Production service SPF: the production module defines a set of production functions PF1 which can be executed autonomously by the production module, such as, for example, the milling of a timber block. The execution of the production function is planned and controlled by a MOM functionality (MOM: manufacturing operations management). In order to permit the autonomous execution of the production function, the respective production function incorporates the requisite real-time control program, SCADA (supervisory control and data acquisition), DCS (distributed control system), MES (manufacturing execution system), software functions including closed control loops, data analysis, production planning, batch control and HMI functionalities (HMI: human-machine interfaces). Moreover, functions on the automation layer 205 and the hardware block 200 can be accessed as required.

Self-description service SSD: the self-description service provides self-descriptive information incorporating properties of the production function for communication to a further production module, and can also receive at least elements of further self-descriptive information for the further production function of the further production module. The self-descriptive information describes various properties of the production function, including, for example, the type of production function, for example milling or screening, restrictions on the production function, for example the permissible weight or dimensions of a workpiece, an operating range of the production function, for example, in the case of a conveyor belt, a conveyor belt speed of 1 cm/s to 35 cm/s, the commands which it understands, for example start and stop, the states which are delivered by the production function, for example, production function ready to receive a workpiece, the states which the production function can understand, for example, the further production function is currently occupied. The self-description service is also known as a digital twin service, i.e. digital twinning.

Coupling service SKD: by means of the coupling service, the production module can arrange a mutual interaction with the further production module in a cooperation zone KZO, for example the transfer of a workpiece, which is executed sequentially, or a simultaneous processing of a workpiece, wherein, for example, the production function holds the workpiece while the further production function cuts a thread in the workpiece. The coupling service establishes various parameters, commands and states in order to permit the interaction of the production function with the further production function. Under certain circumstances, a plurality of cooperation zones with different sets of parameters, commands and states may be provided, wherein, in each cooperation zone, a specific interaction of the production function with the further production function proceeds. The coupling service only defines parameters, commands and states to the extent that interaction is realizable in principle, wherein a specific adaptation of parameters, commands and states is established by the automation service in accordance with a production requirement for the production of a specific product, i.e. from the workpiece, by one or more production functions. For example, the production function and the further production function respectively represent a conveyance of a workpiece by means of a conveyor belt. In the context of the coupling service, it is established that the speed of both conveyor belts must be identical, and the speed can lie in the region of 2 cm/s to 15 cm/s. Practical determination of the speed is then established by the automation service on the basis of the production requirement, for example 10 cm/s. The coupling service also ensures that the production module detects a topology of further production modules in a combination of further production modules, for example in the form of adjoining or superordinate further production modules. The coupling service further assists in the detection of those production modules which can engage in interaction with the production function, on the grounds that, for example, they feature a mutually intersecting working area, or deliver production functions which are couplable, i.e. can cooperate.

Automation service SAS: the automation service defines specific parameters, commands and states for the execution of the production function for a specific product, in accordance with the production requirement, in the form of cooperative information INFO within the cooperation zone.

FIG. 2 further represents interfaces 225, 230, 235 and COMP. For the associated services SPF, SDD, SKD and SPF, these interfaces generally serve for the exchange of data with other services in the dedicated production module and/or the further production module. The interfaces can be configured differently, depending upon requirements such as time delay and bandwidth.

Specifically, the interface COMP, which is also described as the production interface, is configured as a publicly-accessible service interface for the production service. This interface permits the exchange of information between production modules, in the form of commands and in the form of statuses. This is configured as a slimline and uniform interface, such that generic commands and states for the control of any production functions can be realized and executed.

FIG. 3 describes the two phases, the "plug" phase and the "automation" phase, wherein the coupling service implements and executes the plug phase, and the automation service implements and executes the "automation" phase, i.e. the automatic phase. The following steps P1 to P5 are executed in the "plug" phase:

P1: once the production module is supplied with power, it is started-up and initialized, wherein, for example, its various services and its network connection, which may be wireless, are deployed, in order thus to come into contact with further production modules;

P2: the production module investigates a topology of further production modules, for example adjoining or superordinate production modules in the fractal production system. It further investigates which production functions are accessible from the current position of the self-similar production module within the fractal production system, in accordance with the topology detected.

P3: the production module gives notice of its at least one production function, by means of self-descriptive information, to further production modules in the fractal production system.

P4: the production module negotiates with at least one further production module for the determination of a cooperation zone, within which the production function, together with the further production function, specifically sequentially or simultaneously, can be executed upon or for the product. In the process, fundamental parameters such as, for example, commands and states are established.

P5: the production module subscribes to states of the further production module in the cooperation zone, such that it is notified by the further production module in the event of a change in status. The further production module likewise subscribes to states on the production module.

Once the automation service receives a production requirement, to the effect that a product is to be processed from a workpiece in accordance with a production requirement, cooperative information for the cooperation zone is established. To this end, in the "automation" phase, the production module executes the following steps P6 to P9:

P6: in step P6, the production module awaits the communication,
via its production interface, of commands and/or status information, which is received by the production module from the further production module. Thereafter, one of the steps P7 to P9 can be executed, wherein, further to the completion of one of steps P7 to P9, the sequence continues at step P6.

P7: this step involves a reconfiguration of the cooperation zone, for example on the grounds of changes in the product to be produced, or changes within the production system. To this end, steps P2, P3 and P6 can be executed in sequence thereafter.

P8: in step P8, the production function defined, and thereafter parameterized, in step 4 is executed. Thus, further to the reception of a "start" command in step P6, a gripper of a robot arm can pick up the workpiece in step P8, and deposit the latter in a device in which the further production function can be executed. Further to this execution, the production function returns to its start position, and awaits a further "start" command.

P9: in this step, a combined processing function is executed on the workpiece. The production function can thus pick up the workpiece and initially hold it in place, while the further production module executes its further production function. Once the further production function is complete, the production function deposits the workpiece, i.e. the product to be manufactured, on a conveyor belt. The combined processing function is completed accordingly.

FIG. 4 shows an exemplary configuration of the association of the first production module with the second production module to produce a production module system PMS1, which acts in the manner of a production module.

The first production module PM1, as an execution unit AUE, comprises a controllable gripper arm, by means of which a workpiece can be picked up at a first position in a quadrilateral working area and transferred to a second position in the quadrilateral working area. The first production function PF1 thus consists of a conveyance of the workpiece in the definable working area. In addition to conveyance, the first production module can also store the workpiece for a given time period, i.e. the workpiece remains in the gripper of the gripper arm, for example for 10 minutes.

The first production module further comprises a processor unit PROZ with a memory unit, by means of which a production service SPF, a self-description service SSD, a coupling service SKD and an automation service SAS can be constituted. The production module further comprises a wireless interface, for example in the form of a WLAN (wireless local area network), according to one or more IEEE802.11 specifications, via which the interfaces of the individual services can exchange, for example, self-descriptive information, commands and parameters with services of the second production module—which is not represented in detail in FIG. 4. Via the wireless interface, the production interface COMP also exchanges commands and statuses with the second production module. Alternatively or additionally, the production modules in general can undertake the mutual exchange of information, parameters and commands via wireless and/or wired communication interfaces.

The first production module, as self-descriptive information SELF1, incorporates the following content:
Configuration data:
Position: X=500 cm, Y=300 cm
Working area around position:
X=−250 cm . . . +250 cm
Y=−200 cm . . . +200 cm
Z=0 cm . . . +300 cm
Configuration: can accommodate products of dimensions up to 20 cm×20 cm×200 cm
Capability data:
Type data: conveyance, storage
Parameterization data:
  Start position
  End position
Data on marginal conditions: maximum weight 2 kg
Input command data:
  Start
Status data:
  Input: no data
  Output: ready, workpiece collected As configuration data, self-descriptive information indicates a position of the gripper arm, i.e. a location in the production hall, at the location X=500 cm and Y=300 cm in relation to a fixed reference point in the production hall. Moreover, as working area of the gripper arm, a quadrilateral is described around the position of the gripper arm, wherein the gripper arm can deposit or transfer the workpiece within the following absolute working area in the production hall:

X-axis: 500 cm-250 cm=250 cm to 500 cm+250 cm=750 cm

Y-axis: 300 cm-200 cm=100 cm to 300 cm+200 cm=500 cm

Z-axis: 0 cm to 300 cm

The X- and Y-axes are arranged in the floor plane of the production hall, and the Z-axis describes an extension perpendicular to the floor, i.e. in the vertical. A first region B1, described by the X- and Y-axes, is represented in FIG. 5 with cross-hatching.

The configuration also defines that the gripper arm can grip and convey workpieces of dimensions 20 cm×20 cm×200 cm.

As capability data, the self-descriptive information indicates that production functions are of the conveyance or storage type. Moreover, a start position and end position of the gripper can be parameterized by the second production module. The gripper can accommodate a maximum weight of 2 kg. The second production module, as command data, can start-up the autonomous production function. Moreover, the first production module can communicate as status data that the first production module is "ready" for the further execution of the first production function.

Moreover, the first production module can signal that is has picked up the workpiece. No information is stored on the incoming status data from a further production module.

The second production module PM2 is constituted analogously to the first production module. As an execution unit AUE, the second production module comprises a conveyor belt. The second production module incorporates the following, as self-descriptive information SELF 1:

Configuration data:
Position: X=100 cm . . . 900 cm, Y=100 cm . . . 200 cm
Working area: X=0 cm . . . 800 cm, Y=0 cm . . . 100 cm, Z=80 cm
Configuration: can accommodate products of dimensions up to 100 cm×100 cm×100 cm
Capability data:
Type data: conveyance, storage
Parameterization data:
 Speed: 0-10 cm/s
 Direction: forward/reverse
Data on marginal conditions:
 Change of direction at speed=0 only
 Maximum conveyance weight: 10 kg
Input command data:
 Speed
 Direction
 Start
Status data:
 Input: ready, workpiece collected
 Output: speed, direction As configuration data, the self-descriptive information indicates a position of the conveyor belt, i.e. a location in the production hall, which occupies a surface area wherein X=100 cm to 900 cm and Y=100 cm to 200 cm, in relation to a fixed reference point in the production hall. Moreover, as a working area of the conveyor belt, a surface area is described in a plane in the production hall, within which the workpiece can be conveyed by or held on the conveyor belt. The dimensions of this area in the production hall are as follows:

X-axis: 100 cm to 900 cm, i.e. a conveyor belt length of 800 cm

Y-axis: 100 cm to 200 cm, i.e. a conveyor belt width of 100 cm

Z-axis: 80 cm, i.e. the belt of the conveyor belt is arranged at a height of 80 cm;

The X- and Y-axes are arranged in the floor plane of the production hall, and the Z-axis describes an extension perpendicular to the floor, i.e. in the vertical. The workpiece can thus be deposited in the area described by the X-, Y- and Z-axes, and conveyed thence by the conveyor belt or held in store. In the figure, a second region B2 is illustrated, which indicates the working area of the conveyor belt in the X- and Y-planes in the production hall, bordered by dotted lines.

It is further defined by the configuration that the conveyor belt can convey or hold workpieces with maximum dimensions of 100 cm×100 cm×100 cm.

The self-descriptive information describes the following capability data. The available production function is conveyance or storage. The production function permits a parameter setting of the speed from 0 to 10 cm/s. Moreover, the conveyor belt can convey the workpiece forward and in reverse. As a marginal condition for the execution of the second production functions, a change of direction can only be executed at a speed of 0 cm/s, and the maximum weight of the workpiece is 10 kg. For the control of the second production function, as command data, a speed, a direction and a start-up of the second production functions can be transferred to the production service of the second production module PM2. The second production module communicates, as status data, the current speed and direction of the conveyor belt. As input status data, it is detected that the production function which is to be coupled is ready for start-up, and that the workpiece has been picked up from the conveyor belt. In general, in this patent application, the parameterization of the production function is a term employed synonymously with the operating parameters of the production function.

Once the first production module and the second production module have been set-up in the production hall and supplied with power, the production modules are configured such that the latter are ready to execute embodiments of the invention. The two production modules thus initiate a discovery based upon the SOA protocol via the respective WLAN interface, and detect that the following services are mutually addressable:

Production service (SPF);

Self-description service (SSD);

Coupling service (SKD);

Automation service (SAS).

In a subsequent step, both production modules retrieve the respective self-descriptive data by means of the self-description service SSD of the other production module, and save the latter internally in the form of respective further self-descriptive information SELF2. Thereafter, the self-descriptive information SELF1 and the further self-descriptive information SELF2 are analyzed by the two production modules.

In the subsequent step, on the basis of the preceding analysis, the coupling service SKD of the respective production modules executes a check as to whether the two production modules are able to constitute a cooperation zone, in which both are able to cooperate, e.g. for the execution of the production function of the conveyor belt and, temporally thereafter, the production function of the gripper arm. The following "meaningful" combinations are recognized:

| Type data for conveyor belt | Type data for gripper arm |
| --- | --- |
| Conveyance | Storage |
| Storage | Conveyance |
| Conveyance | Conveyance |

Three combinations are recognized for potential cooperation, in the event of a common locational overlap in the execution of the respective production functions, characterized by type data. Thus, in the region X=250 cm . . . 750 cm, Y=100 cm . . . 200 cm and Z=80 cm, there is a spatial overlap between the production functions for conveyance by the conveyor belt and conveyance by the gripper arm. This means that, in this locational region, a cooperation zone KZO has been identified, and both production functions are able to cooperate. Moreover, in the event of cooperation in the production function for conveyance in the first and second production modules, the workpiece can have a maximum weight of 2 kg and dimensions of 20 cm×20 cm×100 cm.

In general, the analysis ascertain the reliable working variables for both production modules, including e.g. the position, the maximum weight and the maximum size of the workpiece. In mathematical terms, this means that a quantity of information is ascertained from the self-descriptive information of the respective production modules which occurs in both production modules, i.e. a "cut set" is constituted for both production modules. "Meaningful" cooperation between the two production modules in the cooperation zone is only possible in the presence of this "cut set".

Thus, in the memory SPE of the two production modules, the following cooperative information INFO is saved for the cooperation zone KZO with respect to the cooperation scenario for the conveyance of the workpiece by the conveyor belt, and temporally sequential conveyance by the gripper arm:
Cooperative information INFO for the second production module:
  Production module:
    Type data: conveyance-conveyance
    Direction: conveyor belt→gripper arm
    Parameterization data:
      End position: X=250 cm . . . 750 cm, Y=100 cm . . . 200 cm, Z=80 cm
    Command data:
      Output: START
    Status data:
      Input: ready, workpiece collected.

The second production module saves the cooperative information that it has established the cooperation zone with the first production module for cooperation by way of "conveyance-conveyance" from the conveyor belt to the gripper arm. As parameterization data, the cooperative information indicates that the end position at which the gripper arm, i.e. the first production function, retrieves the workpiece from the conveyor belt, lies within the region X=250 cm . . . 750 cm, Y=100 cm . . . 200 cm, Z=80 cm, which can be determined more specifically in the subsequent establishment of a production plan, e.g. in the form of a specific position. Moreover, it is established that, as input status data, the second production module requires information from the first production module to the effect that the latter is "ready" for the execution of the first production function. Moreover, it can be signalled to the second production module when the first production function has removed the workpiece from the conveyor belt, i.e. "workpiece collected".

In general, status data are required or delivered by the cooperative information of the respective production module, but with the coupling of the output in the second production module to the input in the first production module, and of the input in the first production module to the output in the second production module. By means of this coupling of incoming and outgoing information, communication between the two production modules is described.

The second production module further transmits the "start" command to the first production module, if the workpiece is ready on the conveyor belt for collection by the first production function.

In an analogous manner, the first production module saves the following cooperative information INFO for the cooperation zone in the event of the execution of the conveyance of the workpiece/product by the conveyor belt, and temporally sequential conveyance by the gripper arm:
Cooperative information INFO for the first production module:
  Production module:
    Type data: conveyance-conveyance
    Direction: conveyor belt→gripper arm
    Parameterization data:
      Start position: X=250 cm . . . 750 cm, Y=100 cm . . . 200 cm, Z=80 cm
    Input command: Start
    Status data:
      Output: ready, workpiece collected.

The second production module actuates the first production function for the collection of the workpiece at the absolute position in the production hall, e.g. X=500 cm, Y=200 cm, Z=80 cm, by means of the "start" command the first production function starts. Moreover, the first production module delivers output status information to the second production module to the effect that the first production function is "ready" for the further conveyance of the workpiece, and that the workpiece has already been collected from the conveyor belt.

In addition to the conveyance—conveyance combination, further cooperation zones, with associated cooperative information, can also be determined and saved in the respective production module. Moreover, determination of the cooperation zone can also be executed in the reverse temporal sequence, specifically where the gripper arm executes a production function, which is temporally succeeded by one of the production functions of the conveyor belt. The procedure for the determination of the further cooperation zones of the conveyor belt—gripper arm—conveyor belt can be executed analogously to the above-mentioned exemplary embodiment.

The second production module PM2 receives a request for the conveyance of a workpiece from one position X=150 cm; Y=150 cm; Z=80 cm to a second position X=700 cm; Y=450 cm; Z=200 cm. Neither the first production module PM1 nor the second production module PM2 is capable of administering this request independently. However, the production module system PM1 can assume this function. The second production module, in combination with the first production module, acts hereinafter as a production module system PM1, wherein communication with respect to the request is externally represented in exactly the same way as if the first or second production module were acting in isolation. Hereinafter, with respect to the request, only cooperation between the first and second production module is described in greater detail. It is assumed that the workpiece is present at the first position X=150 cm; Y=150 cm; Z=80 cm, and can be deposited at the second position X=700 cm; Y=450 cm; Z=200 cm. In a larger production operation, the production module system would generate a cooperation zone for a further production module for the pick-up of the workpiece from the first position, and a cooperation zone for a further production module for the transfer of the workpiece to the second position.

Thereafter, the manner in which the specific configuration of the cooperation zone KZO is to be constituted is retrieved from the automation services SAS of the first and second production module. This specific configuration is generated as cooperation parameter KINF in the respective production module, wherein, situationally, matching of the automation services of the two production modules can also be executed. The first production module thus generates the following cooperation parameters KINF:

Cooperation parameters KINF of the first production module:
   Production module: second production module
      Type data: conveyance-conveyance
      Direction: conveyor belt-gripper arm
      Parameterization data:
         Transfer position: X=600 cm, Y=150 cm, Z=80 cm
      Input command: Start
      Status data:
         Output: ready, workpiece collected.

The content of the cooperation parameters KINF is identical to the cooperative information INFO of the first production module, up to the point: transfer position, at which the second production function transfers the workpiece to the first production function. The two production modules are in agreement to the effect that, at position X=600 cm, Y=150 cm, Z=80 cm, the second production function delivers the workpiece for acquisition by the first production function.

In an analogous manner, the following is established in the second production module:

Cooperation parameters KINF of the second production module:
   Production module: first production module
      Type data: conveyance-conveyance
      Direction: conveyor belt→gripper arm
      Parameterization data:
         Transfer position: X=600 cm, Y=150 cm, Z=80 cm
      Command data:
         Output: Start
      Status data:
         Input: ready, workpiece collected.

In FIG. 5, a third region B3 is indicated by the cross-hatched rectangle. The third region describes the region in the X- and Y-planes, in which the first production function and the second production function can transfer the workpiece, as both production functions can access this region. In the present example, both production modules are in agreement with respect to the transfer position, which is located within the third region.

Production now commences. The first production module communicates its "ready" status via its production interface COMP. The second production function PF2 is actuated by the production service SPF of the second production module, such that the conveyor belt conveys the workpiece to the transfer position X=600 cm, Y=150 cm, Z=80 cm, where it remains in place. Thereafter, the second production module transmits the "start" command to the first production module on the production interface COMP of the first production module, in response to which the production service of the first production module conveys the gripper arm from its resting position to the transfer position X=600 cm, Y=150 cm, Z=80 cm, where it picks up the workpiece, and the gripper arm, with the workpiece, is conveyed to the second position, where the workpiece is to be deposited. Here, the gripper releases the workpiece, and the gripper arm returns to its resting position. The second production module then communicates the statuses to the first production module, to the effect that the workpiece has been collected from the conveyor belt, and the first production function is moreover ready to be restarted. Thereafter, the second production function can be executed once more, and the sequence described in the present paragraph is repeated.

The respective production modules are embodied in the form of a hardware-software combination. To this end, the respective production module incorporates a processor with an associated memory, in which machine-readable code for the execution of embodiments of the invention is saved for processing by the processor. Moreover, the memory is employed for the saving of program data, such as status information or self-descriptive information. The respective production module further comprises input and output units, which are connected to the processor and are configured for the exchange of data, such as self-descriptive information, between the production modules.

Although the present invention has been disclosed in the form of preferred embodiments and variations thereon, it will be understood that numerous additional modifications and variations could be made thereto without departing from the scope of the intention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A production module for the execution of at least one production function upon or for a product, wherein the production function is configured for interaction with a further production function of a further production module in a production operation, and the production module is executable as a self-similar fractal module by means of the following units:
   a) an execution unit for the autonomous execution of the at least one production function;
   b) a processor unit configured to:
      b1) access the at least one production function;
      b2) deliver and communicate self-descriptive information incorporating properties of the production function for the further production module, and receive further self-descriptive information incorporating properties of the further production function;
      b3) determine a cooperation zone, by the constitution of cooperative information, wherein the production function and the further production function, specifically sequentially or simultaneously, can be executed upon or for the product; and
      b4) determine cooperation parameters in the cooperation zone for the execution of the production function upon or for the product, in accordance with a production requirement; and
   c) a production interface for the exchange of control information with the further production module, in the form of commands for the control of the production function and in the form of at least one element of status information for the production function and at least one further element of status information for the further production function;

wherein the further production module and a production module system are also self-similar fractals;

wherein the production module and the further production module at respective interfaces behave the same as the production module system behaves at respective interfaces;

wherein the processor is further configured to establish a combination of the production function and the further production function to form a combined production function of the production module system, and wherein the production module system is configured to execute the combined production function.

2. The production module as claimed in claim 1, wherein the execution unit for the execution of the production function is constituted by means of mechanical components, electrical components, control components, sensor components or software components.

3. The production module as claimed in claim 1, wherein the self-descriptive information can be embodied and implemented in accordance with a standard OPC UA (Unified Architecture) of the OPC Foundation.

4. The production module as claimed in claim 1, wherein the processor is further configured for the execution of the following steps for the determination of the cooperation zone:

detection of a topology of the further production module in a combination of further production modules as an adjoining and/or superordinate further production module;

detection of the further production function, which is available and achievable from a position of the production module in the combination of further production modules;

communication of self-descriptive information to the combination of further production modules;

arrangement of a procedure whereby the production function and the further production function can be executed upon or for the product, specifically sequentially or simultaneously.

5. The production module as claimed in claim 4, wherein, in the step for the arrangement of the cooperation zone, at least one of the following approaches is specified:

provision of an indication of a locational region in which the production function and the further production function are available for execution upon or for the product;

provision of a method and operating parameters of the production function and the further production function for a handover of the product from the production function to the further production function;

provision of a method and operating parameters of the production function and the further production function for a common procedure with respect to the product or with respect to resources for the execution of the production function and of the further production function.

6. The production module as claimed in claim 1, wherein the processor is further configured, in the event of a change with respect to the production module or with respect to the further production module, to initiate the establishment of the cooperative parameters for the cooperation zone.

7. A production module system, comprising:
a production module, and
a further production module,
wherein the production module executes at least one production function upon or for a product, wherein the production function is configured for interaction with a further production function of the further production module in a production operation, and the production module is executable as a self-similar fractal module by means of the following units:
a) an execution unit for the autonomous execution of the at least one production function;
b) a processor unit configured to:
   b1) access the at least one production function;
   b2) deliver and communicate self-descriptive information incorporating properties of the production function for the further production module, and receive further self-descriptive information incorporating properties of the further production function;
   b3) determine a cooperation zone, by the constitution of cooperative information, wherein the production function and the further production function, specifically sequentially or simultaneously, can be executed upon or for the product; and
   b4) determine cooperation parameters in the cooperation zone for the execution of the production function upon or for the product, in accordance with a production requirement; and
c) a production interface for the exchange of control information with the further production module, in the form of commands for the control of the production function and in the form of at least one element of status information for the production function and at least one further element of status information for the further production function;

wherein the further production module and the production module system are also self-similar fractals;

wherein the production module and the further production module at respective interfaces behave the same as the production module system behaves at respective interfaces;

wherein the processor is further configured to establish a combination of the production function and the further production function to form a combined production function of the production module system, and wherein the production module system is configured to execute the combined production function.

* * * * *